United States Patent
Carey et al.

(10) Patent No.: US 8,025,605 B2
(45) Date of Patent: *Sep. 27, 2011

(54) MULTI-SPEED TRANSMISSION FOR A FRONT WHEEL DRIVE VEHICLE

(75) Inventors: Clinton E. Carey, Monroe, MI (US);
Scott H. Wittkopp, Ypsilanti, MI (US);
James M. Hart, Belleville, MI (US);
Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/269,609

(22) Filed: Nov. 12, 2008

(65) Prior Publication Data

US 2009/0215571 A1 Aug. 27, 2009

Related U.S. Application Data

(60) Provisional application No. 61/030,265, filed on Feb. 21, 2008.

(51) Int. Cl.
*F16H 3/44* (2006.01)
(52) U.S. Cl. .......................... 475/317; 475/269; 475/275
(58) Field of Classification Search .................. None
See application file for complete search history.

(56) References Cited

U.S. PATENT DOCUMENTS

| | | | |
|---|---|---|---|
| 6,106,428 A * | 8/2000 | Koneda et al. ................ | 475/210 |
| 6,176,803 B1 | 1/2001 | Meyer et al. | |
| 6,415,685 B1 * | 7/2002 | Taniguchi et al. .......... | 74/606 R |
| 6,558,287 B2 | 5/2003 | Hayabuchi et al. | |
| 6,960,150 B2 | 11/2005 | Armstrong et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,416,508 B1 * | 8/2008 | Carey et al. ................... | 475/275 |
| 7,422,539 B1 * | 9/2008 | Carey et al. ................... | 475/275 |
| 7,824,297 B2 * | 11/2010 | Carey et al. ................... | 475/275 |
| 2004/0166984 A1 * | 8/2004 | Inoue ............................ | 475/207 |
| 2005/0090362 A1 | 4/2005 | Abe et al. | |
| 2006/0270513 A1 | 11/2006 | Klemen | |
| 2006/0270516 A1 | 11/2006 | Klemen | |

* cited by examiner

*Primary Examiner* — Justin Holmes

(57) ABSTRACT

A front wheel drive transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and a brake arranged within a housing.

21 Claims, 2 Drawing Sheets

| CLUTCH | ZONE LOCATION | | | | | |
|---|---|---|---|---|---|---|
| | A | B | C | D | E | F |
| 34 | X | X | | | | X |
| 32 | | X | | X | X | X |
| 28 | X | | X | X | | |
| 30 | | X | | | X | X |
| 26 | X | | X | X | | X |

MULTI-SPEED TRANSMISSION FOR A FRONT WHEEL DRIVE VEHICLE

CROSS-REFERENCE TO RELATED APPLICATIONS

This application claims the benefit of U.S. Provisional Application No. 61/030,265, filed on Feb. 21, 2008, which is hereby incorporated in its entirety herein by reference.

FIELD

The invention relates generally to a multiple speed transmission having a plurality of planetary gear sets and a plurality of torque transmitting devices and more particularly to a transmission configured for a front wheel drive vehicle having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transaxle is provided having an input member, an output member, a plurality of planetary gear sets, and a plurality of torque-transmitting mechanisms. The plurality of planetary gear sets each have a sun gear member, a planetary carrier member, and a ring gear member.

In one aspect of the present invention, the housing of the transaxle has a first wall, a second wall, and a third wall extending between the first and second walls. The first, second, third and fourth planetary gear sets are disposed within the housing. The fourth planetary gear set is adjacent the first wall, the first planetary gear set is adjacent second wall, the third planetary gear set is adjacent the fourth planetary gear set and the second planetary gear set is between the first and third planetary gear sets.

Moreover, the ring gear member of the first planetary gear set is permanently coupled to the sun gear member of the second planetary gear set. The ring gear member of the second planetary gear set is permanently coupled to the planet carrier member of the third planetary gear set. The ring gear member of the third planetary gear set is permanently coupled to the planet carrier member of the fourth planetary gear set. The sun gear member of the third planetary gear set is permanently coupled to the sun gear member of the fourth planetary gear set. The output member is permanently coupled to the carrier member of the fourth planetary gear set. The input member is permanently coupled to the carrier member of the first planetary gear set. The sun gear member of the first planetary gear set is permanently coupled to the housing.

Further, the housing has a first area defined radially inward from an outer periphery of the planetary gear sets and axially bounded by the first wall and the fourth planetary gear set, a second area defined radially inward from the outer periphery of the planetary gear sets and axially bounded by the third and fourth planetary gear sets, a third area defined radially inward from the outer periphery of the planetary gear sets and axially bounded by the second and third planetary gear sets, a fourth area defined radially inward from the outer periphery of the planetary gear sets and axially bounded by the first and second planetary gear set, a fifth area defined radially inward from the outer periphery of the planetary gear sets and axially bounded by the first planetary gear set and the second wall, and a sixth area defined radially inward from the third wall and radially outward from the outer periphery of the planetary gear sets and axially bounded by the first wall and the second wall.

In another aspect of the present invention, a first clutch is disposed in at least one of the first, third, fourth and sixth areas. A second clutch is disposed in at least one of the first, third and fourth areas. A third clutch is disposed in at least one of the second, fifth and sixth areas. A fourth clutch is disposed in at least one of the second, fourth, fifth and sixth areas. A brake is disposed in at least one of the first, second and sixth areas. The clutches and the brake are selectively engageable to establish at least eight forward speed ratios and at least one reverse speed ratio between the input member and the output member.

In yet another aspect of the present invention, a transfer gear train is provided having a first and second transfer gear. The first transfer gear is rotatably fixed to the output member and the second transfer gear is rotatably fixed to an intermediate shaft. A differential gear set is provided for driving a pair of road wheels. A pinion gear is rotatably fixed to the intermediate shaft, and an input differential gear in mesh with the pinion gear and configured to rotatably drive the differential gear set is also provided.

In still another aspect of the present invention, a power transfer assembly having a first and second transfer gear, a power transfer member, a final drive planetary gear set and a differential gear set. The first transfer gear is rotatably fixed to the output member and the second transfer gear is rotatably fixed to a drive shaft. The power transfer member is rotatably coupled to the first and second transfer gear for transferring rotational energy from the first transfer gear to the second transfer gear. The final drive planetary gear set is coupled to the drive shaft for receiving a driving torque from the second transfer gear. The differential gear set is coupled to the final drive planetary gear set and to a pair of road wheels for receiving a final drive rotational torque and transferring the final drive torque to the pair of road wheels.

Further, areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figures 1A, 1B:
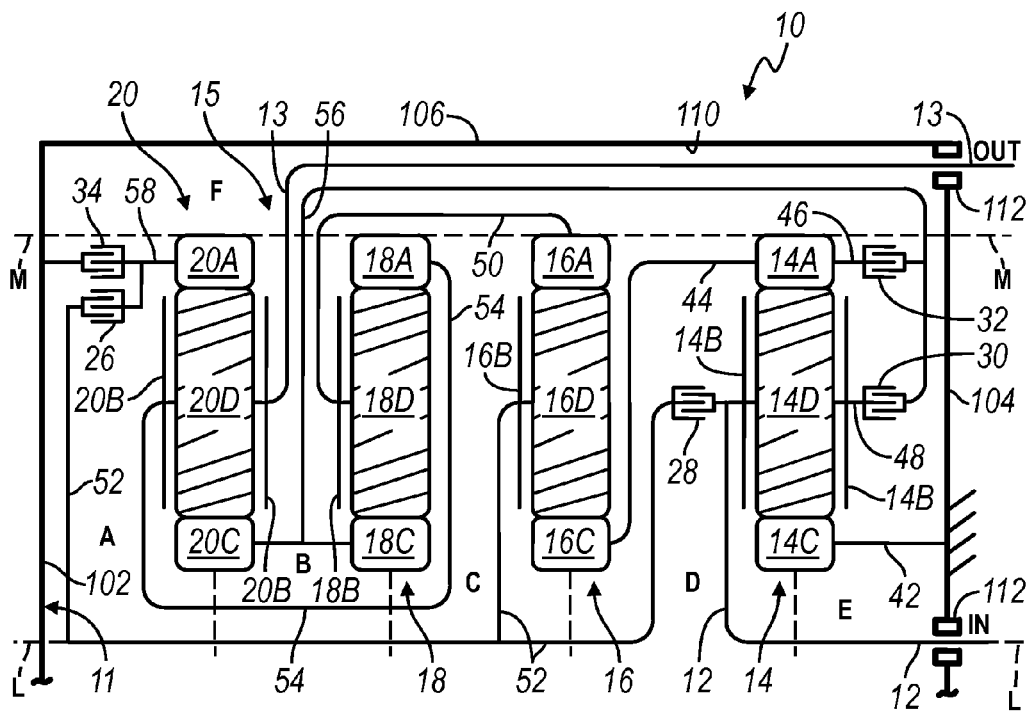
FIG. 1A is a schematic diagram of a gear arrangement for a front wheel drive transmission, according to the principles of the present invention.
FIG. 1B is a chart showing the locations of the torque transmitting devices for the arrangement of planetary gear sets of the transmission shown in FIG. 1A, in accordance with the embodiments of the present invention.
Figure 2:
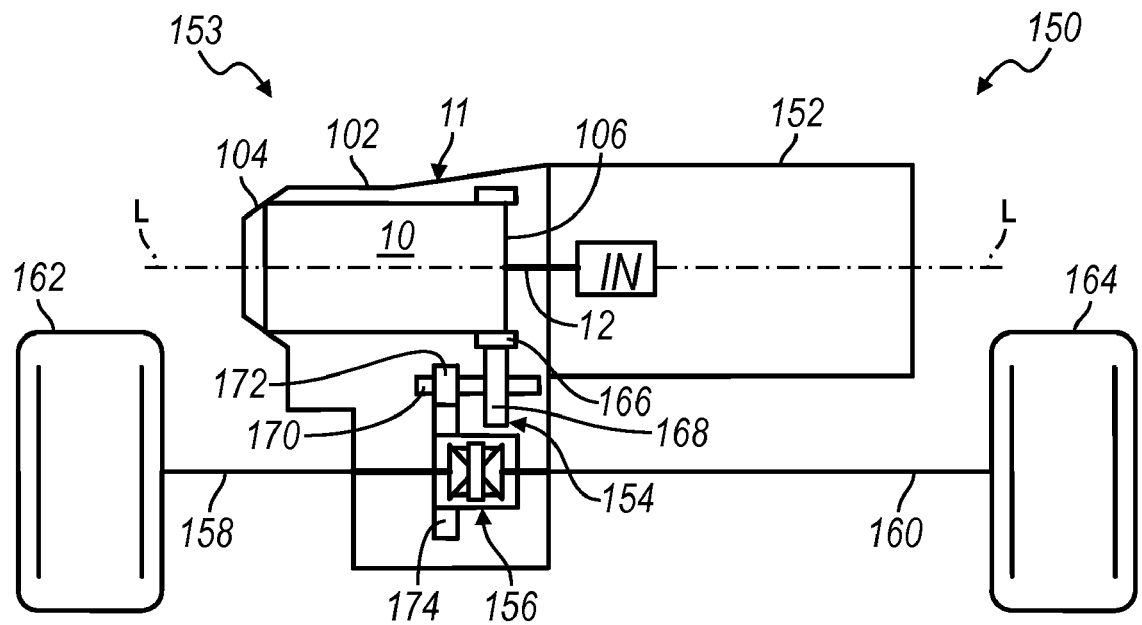
Figure 3:
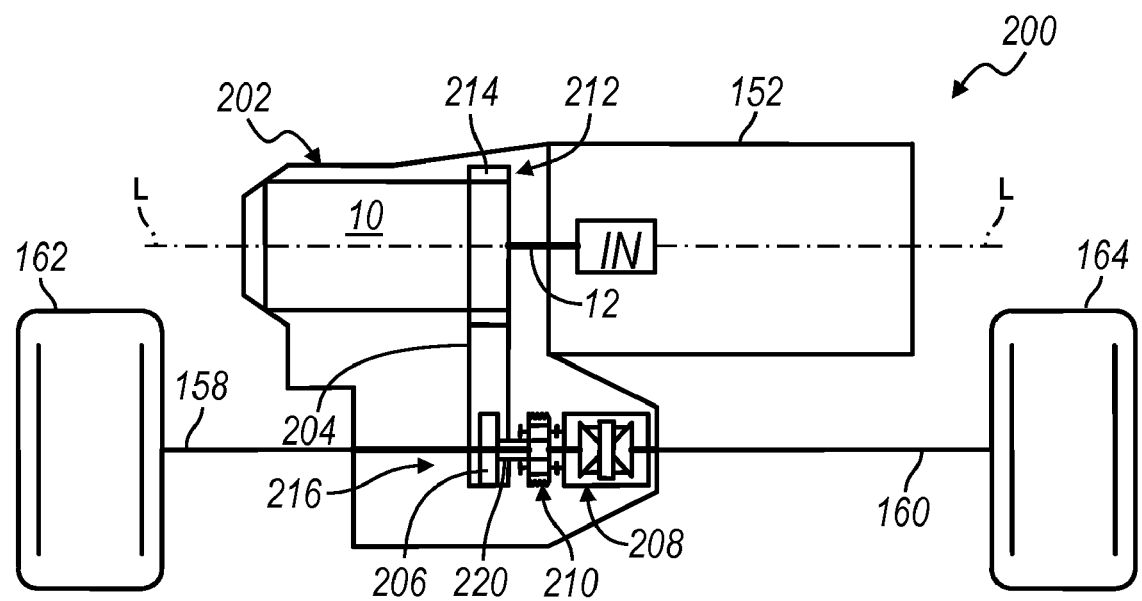

FIG. 2 is a schematic diagram of a front wheel drive transaxle arrangement incorporating the gear arrangement of the transmission of FIG. 1A and FIG. 1B, according to the principles of the present invention; and FIG. 3 is a schematic diagram of another embodiment of a front wheel drive transaxle arrangement incorporating the gear arrangement of the transmission of FIG. 1A and FIG. 1B, according to the principles of the present invention.

DETAILED DESCRIPTION

The following description is merely exemplary in nature and is not intended to limit the present disclosure, application, or uses.

Referring now to FIG. 1A, an embodiment of a front wheel drive multi-speed or eight speed transmission is generally indicated by reference number 10. The transmission 10 is illustrated as a front wheel drive or transverse transmission, though various other types of transmission configurations may be employed. The transmission 10 includes a transmission housing 11, an input shaft or member 12, an output shaft or member 13 and a gear arrangement 15. The input member 12 is continuously connected to an engine (not shown) or to a turbine of a torque converter (not shown). The output member 13 is continuously connected with a final drive unit (not shown) or transfer case (not shown).

The gear arrangement 15 of transmission 10 includes a first planetary gear set 14, a second planetary gear set 16, a third planetary gear set 18, and a fourth planetary gear set 20. The planetary gear sets 14, 16, 18 and 20 are connected between the input member 12 and the output member 13.

In a preferred embodiment of the present invention, the planetary gear set 14 includes a sun gear member 14C, a ring gear member 14A, and a planet carrier member 14B that rotatably supports a set of planet or pinion gears 14D (only one of which is shown). The sun gear member 14C is connected to transmission housing 11 with a first shaft or intermediate member 42. The ring gear member 14A is connected for common rotation with a second shaft or intermediate member 44 and a third shaft or intermediate member 46. The planet carrier member 14B is connected for common rotation with input shaft or member 12 and a fourth shaft or intermediate member 48. The pinion gears 14D are configured to intermesh with the sun gear member 14C and the ring gear member 14A.

The planetary gear set 16 includes a ring gear member 16A, a planet carrier member 16B that rotatably supports a set of planet or pinion gears 16D and a sun gear member 16C. The ring gear member 16A is connected for common rotation with a fifth shaft or intermediate member 50. The sun gear member 16C is connected for common rotation with the second shaft or intermediate member 44. The planet carrier member 16B is connected for common rotation with the sixth shaft or intermediate member 52. The pinion gears 16D are configured to intermesh with the sun gear member 16C and the ring gear member 16A.

The planetary gear set 18 includes a ring gear member 18A, a planet carrier member 18B that rotatably supports a set of planet or pinion gears 18D and a sun gear member 18C. The ring gear member 18A is connected for common rotation with a seventh shaft or intermediate member 54. The sun gear member 18C is connected for common rotation with the eighth shaft or intermediate member 56. The planet carrier member 18B is connected for common rotation with the fifth shaft or intermediate member 50. The pinion gears 18D are configured to intermesh with the sun gear member 18C and the ring gear member 18A.

The planetary gear set 20 includes a sun gear member 20C, a ring gear member 20A, and a carrier member 20B that rotatably supports a set of planet or pinion gears 20D. The sun gear member 20C is connected for common rotation with the eighth shaft or intermediate member 56. The ring gear member 20A is connected for common rotation with a ninth shaft or intermediate member 58. The planet carrier member 20B is connected for common rotation with the output shaft or member 13 and the seventh shaft or intermediate member 54. The pinion gears 20D are configured to intermesh with the sun gear member 20C and the ring gear member 20A.

The transmission 10 also includes a plurality of torque-transmitting mechanisms or devices including a first clutch 26, a second clutch 28, a third clutch 30, a fourth clutch 32 and a brake 34. The first clutch 26 is selectively engagable to connect the sixth shaft or intermediate member 52 to the ninth shaft or intermediate member 58. The second clutch 28 is selectively engagable to connect the input shaft or member 12 to the sixth intermediate member 52. The third clutch 30 is selectively engagable to connect the fourth intermediate member 48 to the eighth intermediate shaft or member 56. The fourth clutch 32 is selectively engagable to connect the third shaft or intermediate member 46 to the eighth shaft or intermediate member 56. Finally, the brake 34 is selectively engagable to connect the ninth intermediate member 58 to the transmission housing 11 to restrict rotation of the member 58 relative to the transmission housing 11.

The transmission 10 is capable of transmitting torque from the input shaft or member 12 to the output shaft or member 13 in at least eight forward torque ratios and one reverse torque ratio. Each of the forward torque ratios and the reverse torque ratio are attained by engagement of one or more of the torque-transmitting mechanisms (i.e. first clutch 26, second clutch 28, third clutch 30, fourth clutch 32 and brake 34). Those skilled in the art will readily understand that a different speed ratio is associated with each torque ratio. Thus, eight forward speed ratios may be attained by the transmission 10.

The transmission housing 11 includes a first wall or structural member 102, a second wall or structural member 104 and a third wall or structural member 106. The third wall 106 interconnects the first and second walls 102 and 104 to define a space or cavity 110. The input shaft or member 12 and output shaft or member 13 are supported by the second wall 104 by bearings 112. The planetary gear sets 14, 16, 18 and 20 and the torque-transmitting mechanisms 26, 28, 30, 32 and 34 are disposed within cavity 110. Further, the cavity 110 has a plurality of areas or zones A, B, C, D, E, and F in which the plurality of torque transmitting mechanisms 26, 28, 30, 32 and 34 will be specifically positioned or mounted, in accordance with the preferred embodiments of the present invention.

As shown in FIG. 1A, zone A is defined by the area or space bounded by: the first wall 102, planetary gear set 20, radially inward by a reference line "L" which is a longitudinal line that is axially aligned with the input shaft 12, and radially outward by a reference line "M" which is a longitudinal line that extends adjacent an outer diameter or outer periphery of the planetary gear sets 14, 16, 18 and 20. While reference line "M" is illustrated as a straight line throughout the several views, it should be appreciated that reference line "M" follows the outer periphery of the planetary gear sets 14, 16, 18 and 20, and accordingly may be stepped or non-linear depending on the location of the outer periphery of each of the planetary gear sets 14, 16, 18 and 20. Zone B is defined by the area bounded by: planetary gear set 20, the planetary gear set 18, radially outward by reference line "M", and radially inward by reference line "L". Zone C is defined by the area bounded by: the planetary gear set 18, the planetary gear set 16, radially outward by reference line "M", and radially inward by reference line "L". Zone D is defined by the area bounded by: the planetary gear set 16, the planetary gear set 14, radially outward by reference line "M", and radially inward by reference line "L". Zone E is defined by the area bounded by: the planetary gear set 14, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 15 of transmission 10 shown in FIG. 1A, the planetary gear set 20 is disposed closest to the first wall 102, the planetary gear set 14 is disposed closest to the second wall 104, the planetary gear set 18 is adjacent the planetary gear set 20, and the planetary gear set 16 is disposed between the planetary gear sets 18 and 14. The torque-transmitting mechanisms are intentionally located within specific Zones in order to provide advantages in overall transmission size, packaging efficiency, and reduced manufacturing complexity. In the particular example shown in FIG. 1A, the first clutch 26 and brake 34 are disposed within Zone A, the second clutch 28 is disposed within Zone D, the third and fourth clutches 30 and 32 are disposed within Zone E.

However, the present invention contemplates other embodiments where the torque-transmitting mechanisms 26, 28, 30, 32 and 34 are disposed in the other Zones. The feasible locations of the torque-transmitting mechanisms 26, 28, 30, 32 and 34 within the Zones are illustrated in the chart shown in FIG. 1B. The chart of FIG. 1B lists clutches and the brake in the left most column and the available zones to locate the clutch/brake in the top row. An "X" in the chart indicates that the present invention contemplates locating the clutch or brake in the zone listed in the top row. For example, brake 34 may be located in zones A, B or F and fourth clutch 32 may be located in zones B, D, E or F.

Referring now to FIG. 2, a front wheel drive powertrain 150 incorporating a transaxle 153 is illustrated, in accordance with the embodiments of the present invention. Transaxle 153 includes the transmission 10 having the gear arrangement 15 of FIGS. 1A and 1B. Transmission 10 is mounted to an engine 152. Engine 152 provides a driving torque through input shaft 12 to transmission 10. Engine 152 is generally an internal combustion engine, however, the present invention contemplates other types of engines such as electric and hybrid engines. Further, transaxle 153 includes a transfer gear train 154, a differential 156, and a pair of drive axles 158 and 160 that drive a pair of road wheels 162 and 164, respectively.

Transfer gear train 154 includes a first transfer gear 166 and a second transfer gear 168. Output shaft or member 13 is coupled to the first transfer or spur gear 166. First transfer gear 166 may be a straight spur gear having straight gear teeth or a helical gear having helical gear teeth. First transfer gear 166 meshes with the second transfer gear 168. Second transfer gear 168 is rotatably fixed to an intermediate shaft or rotatable member 170. Further, a pinion 172 is mounted to shaft 170 and intermeshes with an input differential gear 174. Input differential gear 174 transfers driving torque to the differential 156. Differential 156, as conventionally known, transfers the driving torque generated by engine 152 to the two drive axles 158 and 160. Drive axles 158 and 160 are independently driven by differential 156 to supply the driving torque to the vehicle road wheels 162 and 164.

Referring now to FIG. 3, another embodiment of a front wheel drive powertrain 200 incorporating a transaxle 202 is illustrated, in accordance with the embodiments of the present invention. Transaxle 202 includes the gear arrangement 15 of transmission 10 of FIGS. 1A and 1B and is mounted to the engine 152. Engine 152 provides a driving torque through input shaft 12 to transmission gear arrangement 10. Further, transaxle 202 includes a transfer chain 204, a driven sprocket or gear 206, a differential 208, a final drive planetary gear set 210 and a pair of drive axles 158 and 160 that drive a pair of road wheels 162 and 164, respectively.

Transfer chain 204 engages at a first end 212 a drive sprocket or gear 214 and at a second end 216 the driven sprocket or gear 206. The drive sprocket 214 is coupled to output shaft or member 13. Driven sprocket 206 is rotatably fixed to a drive shaft or rotatable member 220. Further, drive shaft 220 is coupled to the sun gear of the final drive planetary gear set 210 to achieve the desired gear ratio. The final drive planetary gear set 210 transfers driving torque to the differential 208 though the carrier member of the final drive planetary gear set 210 to the housing of the differential 208. Differential 208, as conventionally known, transfers the driving torque generated by engine 152 to the two drive axles 158 and 160 through bevel gears of differential 208. Drive axles 158 and 160 are independently driven by differential 208 to supply the driving torque to the vehicle road wheels 162 and 164.

The description of the invention is merely exemplary in nature and variations that do not depart from the gist of the invention are intended to be within the scope of the invention. Such variations are not to be regarded as a departure from the spirit and scope of the invention.

The invention claimed is:
1. A transaxle comprising:
an input member;
an output member;
a housing having a first wall, a second wall, and a third wall extending between the first and second walls;
a first, second, third and fourth planetary gear sets disposed within the housing, wherein the fourth planetary gear set is adjacent the first wall, the first planetary gear set is adjacent second wall, the third planetary gear set is adjacent the fourth planetary gear set and the second planetary gear set is between the first and third planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the second planetary gear set, the ring gear member of the second planetary gear set is permanently coupled to the planet carrier member of the third planetary gear set, the ring gear member of the third planetary gear set is permanently coupled to the planet carrier member of the fourth planetary gear set, the sun gear member of the third planetary gear set is permanently coupled to the sun gear member of the fourth planetary gear set, the output member is permanently coupled with the carrier member of the fourth planetary gear set, the input member is permanently coupled with the carrier member of the first planetary gear set, and the sun gear member of the first planetary gear set is permanently coupled to the housing, and wherein the housing has a first area defined radially inward from an outer periphery of the planetary gear sets and axially bounded by the first wall and the fourth planetary gear set, a second area defined radially inward from the outer periphery of the planetary gear sets and axially bounded by the third and fourth planetary gear sets, a third area defined radially inward from the outer periphery of the planetary gear sets and axially bounded by the second and third planetary gear sets, a fourth area defined radially inward from the outer periphery of the planetary gear sets and axially bounded by the first and second planetary gear set, a fifth area defined radially inward from the outer periphery of the planetary gear sets and axially bounded by the first planetary gear set and the second wall, and a sixth area defined radially inward from the third wall and radially outward from the outer periphery of the planetary gear sets and axially bounded by the first wall and the second wall;

a first clutch disposed in at least one of the first, third, fourth and sixth areas;

a second clutch disposed in at least one of the first, third and fourth areas;

a third clutch disposed in at least one of the second, fifth and sixth areas;

a fourth clutch disposed in at least one of the second, fourth, fifth and sixth areas;

a brake disposed in at least one of the first, second and sixth areas, and wherein the clutches and the brake are selectively engageable to establish at least eight forward speed ratios and at least one reverse speed ratio between the input member and the output member;

a transfer gear train having a first and second transfer gear, wherein the first transfer gear is rotatably fixed to the output member and the second transfer gear is rotatably fixed to an intermediate shaft;

a differential gear set for driving a pair of road wheels;

a pinion gear rotatably fixed to the intermediate shaft; and an input differential gear in mesh with the pinion gear and configured to rotatably drive the differential gear set.

2. The transaxle of claim 1 wherein the first clutch is selectively engageable to interconnect the planet carrier member of the second planetary gear set with the ring gear member of the fourth planetary gear set and is disposed in the first area, the second clutch is disposed in the fourth area, the third clutch is disposed in the fifth area, the fourth clutch is disposed in the fifth area and the brake is disposed in the first area.

3. The transaxle of claim 1 wherein the first clutch is disposed within the first area.

4. The transaxle of claim 1 wherein the first clutch is disposed within the third area.

5. The transaxle of claim 1 wherein the first clutch is disposed within the fourth area.

6. The transaxle of claim 1 wherein the first clutch is disposed within the sixth area.

7. The transaxle of claim 1 wherein the second clutch is selectively engageable to interconnect the planet carrier member of the second planetary gear set with the planet carrier member of the first planetary gear set and the input member and wherein the second clutch is disposed within the first area.

8. The transaxle of claim 1 wherein the second clutch is disposed within the third area.

9. The transaxle of claim 1 wherein the second clutch is disposed within the fourth area.

10. The transaxle of claim 1 wherein the third clutch is selectively engageable to interconnect the planet carrier member of the first planetary gear set with the sun gear members of the third and fourth planetary gear sets and wherein the third clutch is disposed within the second area.

11. The transaxle of claim 1 wherein the third clutch is disposed within the fifth area.

12. The transaxle of claim 1 wherein the third clutch is disposed within the sixth area.

13. The transaxle of claim 1 wherein the fourth clutch is selectively engageable to interconnect the ring gear member of the first planetary gear set with the sun gear members of the third and fourth planetary gear sets and wherein the fourth clutch is disposed within the second area.

14. The transaxle of claim 1 wherein the fourth clutch is disposed within the fourth area.

15. The transaxle of claim 1 wherein the fourth clutch is disposed within the fifth area.

16. The transaxle of claim 1 wherein the fourth clutch is disposed within the sixth area.

17. The transaxle of claim 1 wherein the brake is selectively engageable to interconnect the ring gear member of the fourth planetary gear set to the housing and wherein the brake is disposed within the first area.

18. The transaxle of claim 1 wherein the brake is disposed within the second area.

19. The transaxle of claim 1 wherein the brake is disposed within the sixth area.

20. A transaxle comprising:

an input member;

an output member;

a housing having a first wall, a second wall, and a third wall extending between the first and second walls;

a first, second, third and fourth planetary gear set disposed within the housing, wherein the fourth planetary gear set is adjacent the first wall, the first planetary gear set is adjacent second wall, the third planetary gear set is adjacent the fourth planetary gear set and the second planetary gear set is between the first and third planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the second planetary gear set, the ring gear member of the second planetary gear set is permanently coupled to the planet carrier member of the third planetary gear set, the ring gear member of the third planetary gear set is permanently coupled to the planet carrier member of the fourth planetary gear set, the sun gear member of the third planetary gear set is permanently coupled to the sun gear member of the fourth planetary gear set, the output member is permanently coupled with the carrier member of the fourth planetary gear set, the input member is permanently coupled with the carrier member of the first planetary gear set, and the sun gear member of the first planetary gear set is permanently coupled to the housing, and wherein the housing has a first area defined radially inward from an outer periphery of the planetary gear sets and axially bounded by the first wall and the fourth planetary gear set, a second area defined radially inward from the outer periphery of the planetary gear sets and axially bounded by the third and fourth planetary gear sets, a third area defined radially inward from the outer periphery of the planetary gear sets and axially bounded by the second and third planetary gear sets, a fourth area defined radially inward from the outer periphery of the planetary gear sets and axially bounded by the first and second planetary gear set, a fifth area defined radially inward from the outer periphery of the planetary gear sets and axially bounded by the first planetary gear set and the second wall, and a sixth area defined radially inward from the third wall and radially outward from the outer periphery of the planetary gear sets and axially bounded by the first wall and the second wall;

a first clutch disposed in at least one of the first, third, fourth and sixth areas;

a second clutch disposed in at least one of the first, third and fourth areas;

a third clutch disposed in at least one of the second, fifth and sixth areas;

a fourth clutch disposed in at least one of the second, fourth, fifth and sixth areas;

a brake disposed in at least one of the first, second and sixth areas, and wherein the clutches and the brake are selectively engageable to establish at least eight forward speed ratios and at least one reverse speed ratio between the input member and the output member, a power transfer assembly having a first and second transfer gear, wherein the first transfer gear is rotatably fixed to the output member and the second transfer gear is rotatably fixed to a drive shaft;

a power transfer member rotatably coupling the first and second transfer gears for transferring rotational energy from the first transfer gear to the second transfer gear;

a final drive planetary gear set coupling the drive shaft for receiving a driving torque from the second transfer gear; and a differential gear set coupled to the final drive planetary gear set and to a pair of road wheels for receiving a final drive rotational torque and transferring the final drive torque to the pair of road wheels.

21. The transaxle of claim 20, wherein the power transfer member is a chain or a belt.

* * * * *